S. B. BUSHFIELD.

Slate-Frames.

No. 6,221. Reissued Jan. 12, 1875.

WITNESSES

Franck L. Durand

C. L. Emmons

INVENTOR

Samuel B. Bushfield per Alexander Mason

Attorneys

THE GRAPHIC CO. PHOTO-LITH. 39 & 41 PARK PLACE, N.Y.

UNITED STATES PATENT OFFICE.

SAMUEL B. BUSHFIELD, OF BALTIMORE, MARYLAND.

IMPROVEMENT IN SLATE-FRAMES.

Specification forming part of Letters Patent No. 99,841, dated February 15, 1870; reissue No. 6,221, dated January 12, 1875; application filed December 10, 1874.

*To all whom it may concern:*

Be it known that I, SAMUEL B. BUSHFIELD, of Baltimore, in the county of Baltimore and State of Maryland, have invented certain new and useful Improvements in Slate-Frames; and I do hereby declare that the following is a full, clear, and exact description thereof, reference being had to the accompanying drawings and to the letters of reference marked thereon, which form a part of this specification.

The nature of my invention consists in a slate-frame provided with an orifice for the insertion of a pencil; also, in a sliding bar in combination with and at right angles to the recess or orifice in the slate-frame. It also consists in the combination with a slate-frame of a corrugated pencil-sharpening bar, all as hereinafter more fully set forth.

In order to enable others skilled in the art to which my invention appertains to make and use the same, I will now proceed to describe its construction and operation, referring to the annexed drawing, in which—

Figure 2:
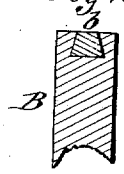

Figure is a front view of a slate embodying my invention, the slate-frame being partially in section. Fig. 2 is a transverse vertical section of the frame and slide which covers the pencil-case.

Figure 1:
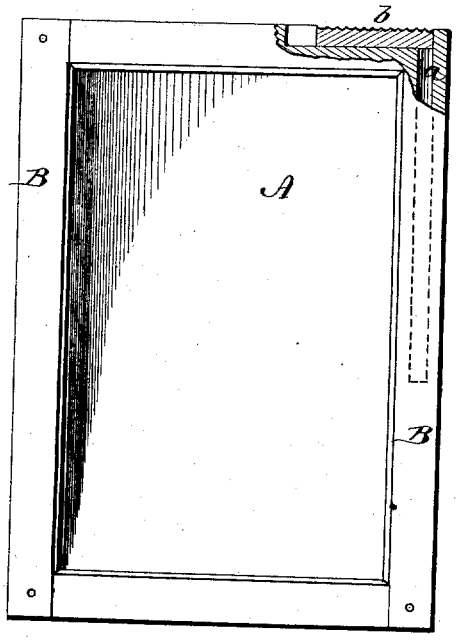

A represents the slate, with the frame B made in any of the known and usual ways. One side of the frame B is bored out, as shown in Fig. 1, so as to form a convenient receptacle *a*, in which the pencil may be kept. The upper end of this receptacle may be covered by a sliding bar, *b*, which is dovetailed into the frame at right angles to the receptacle or orifice *a*. The upper side of the sliding bar *b* is corrugated or otherwise made uneven, so that it can be used to sharpen the pencil upon.

Having thus fully described my invention, what I claim as new, and desire to secure by Letters Patent, is—

1. In a slate-frame, a sliding bar in combination with and arranged at right angles to the recess *a*, substantially as set forth.

2. The corrugated pencil-sharpening slide-bar *b*, in combination with a slate-frame, as set forth.

In testimony that I claim the foregoing I have hereunto set my hand this 5th day of November, 1874.

SAMUEL B. BUSHFIELD.

Witnesses:
C. L. EVERT,
F. L. OURAND.